US009848019B2

United States Patent
Kotecha et al.

(10) Patent No.: US 9,848,019 B2
(45) Date of Patent: Dec. 19, 2017

(54) FAILOVER FOR MOBILE DEVICES

(71) Applicant: Verizon Patent and Licensing Inc., Basking Ridge, NJ (US)

(72) Inventors: Lalit R. Kotecha, San Ramon, CA (US); Bhaskar R. Gudlavenkatasiva, Temple Terrace, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 507 days.

(21) Appl. No.: 13/905,472

(22) Filed: May 30, 2013

(65) Prior Publication Data

US 2014/0358985 A1 Dec. 4, 2014

(51) Int. Cl.
H04L 29/06 (2006.01)

(52) U.S. Cl.
CPC ...... *H04L 65/1053* (2013.01); *H04L 65/1063* (2013.01); *H04L 65/1069* (2013.01); *H04L 65/1093* (2013.01)

(58) Field of Classification Search
CPC ............. H04L 65/1053; H04L 65/1063; H04L 65/1069; H04L 65/1093
See application file for complete search history.

(56) References Cited

U.S. PATENT DOCUMENTS

| 789,009 | A | * | 5/1905 | Pearson | 2/261 |
| 6,236,326 | B1 | * | 5/2001 | Murphy | H04M 1/006 340/4.4 |
| 6,584,316 | B1 | * | 6/2003 | Akhteruzzaman | H04W 36/32 455/417 |
| 6,907,237 | B1 | * | 6/2005 | Dorenbosch et al. | 455/404.1 |
| 7,616,950 | B2 | * | 11/2009 | Pearson et al. | 455/417 |
| 8,345,840 | B2 | * | 1/2013 | Sun | H04M 3/08 370/216 |
| 2002/0137498 | A1 | * | 9/2002 | Goss et al. | 455/417 |
| 2005/0096029 | A1 | * | 5/2005 | Pelaez | H04M 3/54 455/419 |
| 2006/0183469 | A1 | * | 8/2006 | Gadson | H04M 3/42136 455/419 |
| 2007/0047585 | A1 | * | 3/2007 | Gillespie | H04L 29/06 370/475 |
| 2008/0062964 | A1 | * | 3/2008 | Kumarasamy | H04L 65/104 370/352 |
| 2009/0147937 | A1 | * | 6/2009 | Sullhan | H04M 3/42068 379/201.02 |

(Continued)

*Primary Examiner* — Jerry Dennison

(57) ABSTRACT

A device may receive information that identifies a failover configuration associated with a user device. The failover configuration may identify a backup user device. The device may receive information indicating that a failover condition, identified in the failover configuration, has been satisfied. The device may identify the backup user device based on receiving the information indicating that the failover condition has been satisfied. The device may contact the backup user device based on identifying the backup user device. The device may determine that a service request, associated with a service and intended for the user device, is to be forwarded to the backup user device based on contacting the backup user device. The service may be identified by the failover configuration. The device may forward the service request to the backup user device to permit the backup user device to obtain the service rather than the user device.

20 Claims, 14 Drawing Sheets

(56) References Cited

U.S. PATENT DOCUMENTS

| | | | |
|---|---|---|---|
| 2010/0159906 A1* | 6/2010 | Vander Veen | H04W 4/16 455/417 |
| 2012/0036261 A1* | 2/2012 | Salazar | H04L 67/24 709/225 |
| 2012/0115451 A1* | 5/2012 | Roka | H04M 3/42 455/417 |
| 2013/0219288 A1* | 8/2013 | Rosenberg | H04M 3/54 715/748 |
| 2014/0006502 A1* | 1/2014 | Gandhi | G06F 9/52 709/204 |
| 2014/0237123 A1* | 8/2014 | Dave | H04W 52/0261 709/227 |
| 2014/0287732 A1* | 9/2014 | Kannan K | H04W 4/16 455/417 |
| 2014/0289382 A1* | 9/2014 | Chan | G06F 9/54 709/221 |
| 2014/0358985 A1* | 12/2014 | Kotecha | H04L 65/1063 709/202 |
| 2015/0249512 A1* | 9/2015 | Adimatyam | H04H 20/12 725/107 |
| 2016/0092322 A1* | 3/2016 | Nosov | G06F 11/2007 714/4.11 |

* cited by examiner

| User Device ID 510 | Device Type 520 | Failover Priority 530 | Service 540 | Failover Condition 550 |
|---|---|---|---|---|
| PUD | Primary | 1 | N/A | 10% battery remaining, Device powered off |
| BUD1 | Backup | 2 | Voice, Text, Videocall | No coverage |
| BUD2 | Backup | 3 | VideoCall | N/A |

FIG. 5

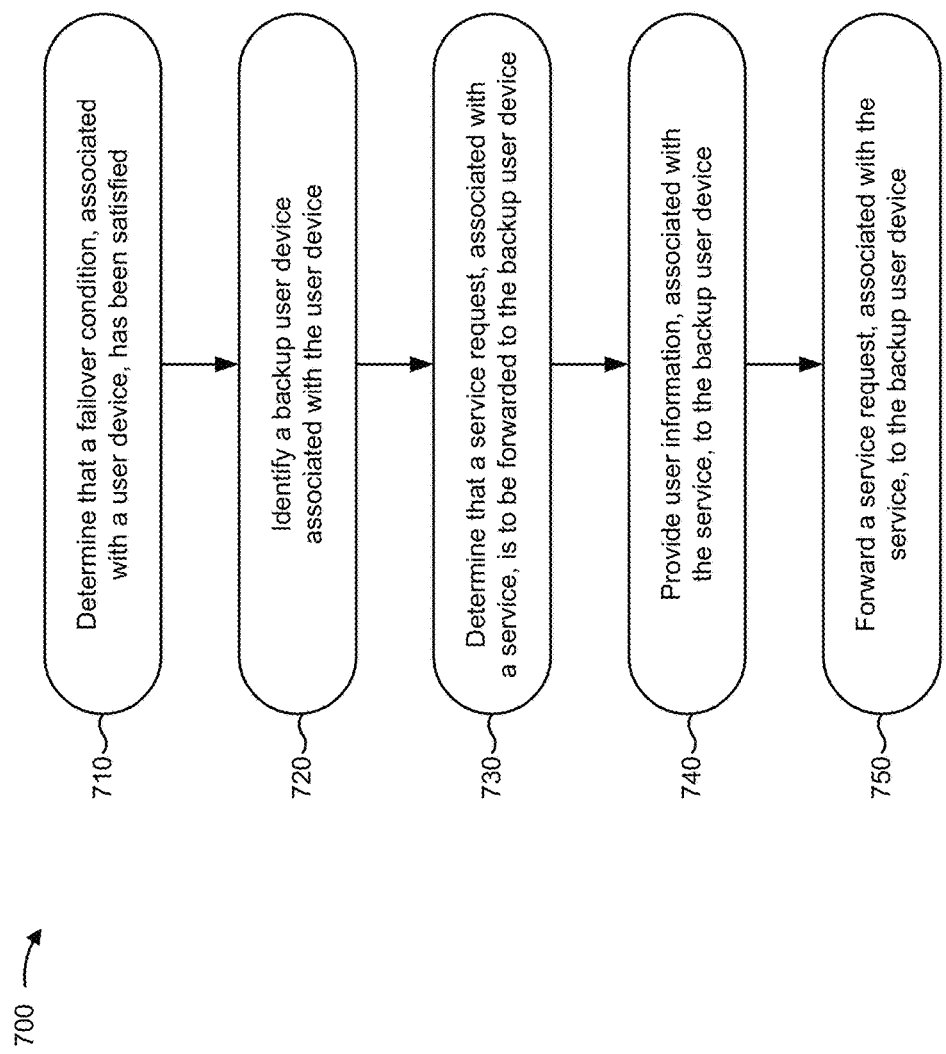

FAILOVER FOR MOBILE DEVICES

BACKGROUND

A service provider network may be capable of providing a variety of services (e.g., a voice service, a messaging service, a multimedia service, an application service, etc.) to one or more user devices associated with a user. Some users may be associated with multiple user devices, and may access the services using one or more of the multiple user devices.

BRIEF DESCRIPTION OF THE DRAWINGS

FIG. 5 is a diagram of an example data structure that stores a failover configuration associated with a user device;

FIG. 7 is a flow chart of an example process for identifying a backup user device and forwarding a service request to the backup user device;

DETAILED DESCRIPTION

The following detailed description of example implementations refers to the accompanying drawings. The same reference numbers in different drawings may identify the same or similar elements.

A user may carry multiple user devices (e.g., a smart phone associated with a job, a personal smart phone, a tablet, etc.) that may be capable of receiving a service provided by a service provider network (e.g., a voice service, a messaging service, a multimedia service, an application service, etc.). The user may wish for a primary user device, of the multiple user devices, to receive the service. However, limitations of the primary user device (e.g., a battery life, a signal strength, etc.) may limit the ability of the primary user device to receive the service. As such, a user may wish for the service to be provided to another of the multiple user devices carried by the user (e.g., a backup user device) in the event that the primary user device has detected a condition (e.g., a failover condition), associated with the primary user device, that may affect the provision of the service to the primary user device. The user may also specify one or more backup user devices. Implementations described herein may allow a service to be provided to (e.g., failover to) a backup user device, specified by a user, when a primary user device or another backup user device has detected a failover condition.

Figure 1:
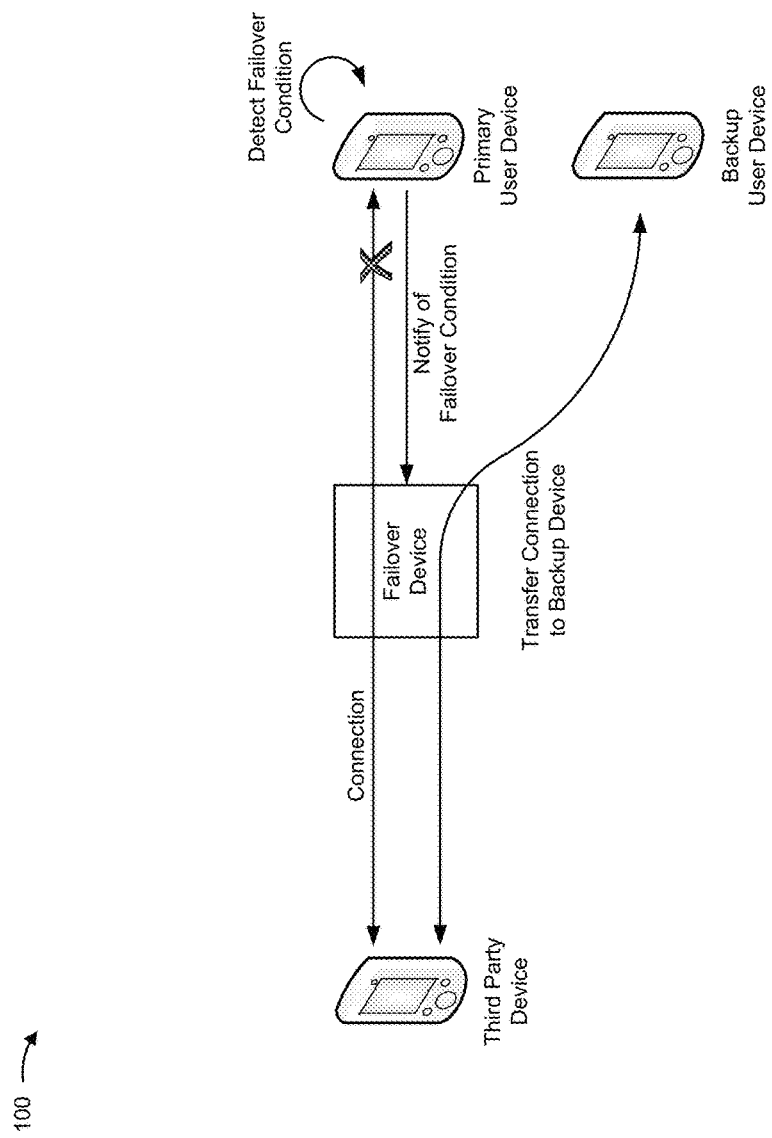
FIG. 1 is a diagram of an overview of an example implementation described herein.

FIG. 1 is a diagram of an overview of an example implementation 100 described herein. For the purposes of FIG. 1, assume that a service provider network is providing a service to a primary user device, such as a mobile phone, that allows the primary user device to connect to a third party device, such as another mobile phone. As shown in FIG. 1, the primary user device may detect a failover condition (e.g., a low battery life, a low signal strength, etc.) associated with the primary user device. As further shown, the primary user device may send information indicating that the failover condition has been satisfied to a failover device associated with the service provider network.

As further shown in FIG. 1, the failover device may receive the information from the primary user device. The failover device may determine that the service (e.g., the service associated with the connection between the primary user device and the third party device) is to failover to a backup user device associated with the primary user device (e.g., based on information stored by the failover device, etc.). In some implementations, a user of the primary user device and the backup user device may specify that the backup user device is a backup for the primary user device. As further shown, the failover device may forward a service request, associated with the service, to the backup user device (e.g., the backup user device may be connected to the third party device). In this way, a service, provided by a service provider network, may failover from a primary user device to a backup user device based on the primary user device detecting that a failover condition has been satisfied. In some implementations, a user of the primary user device and the backup user device may specify the failover condition and/or the service(s) to be failed over.

Figure 2:
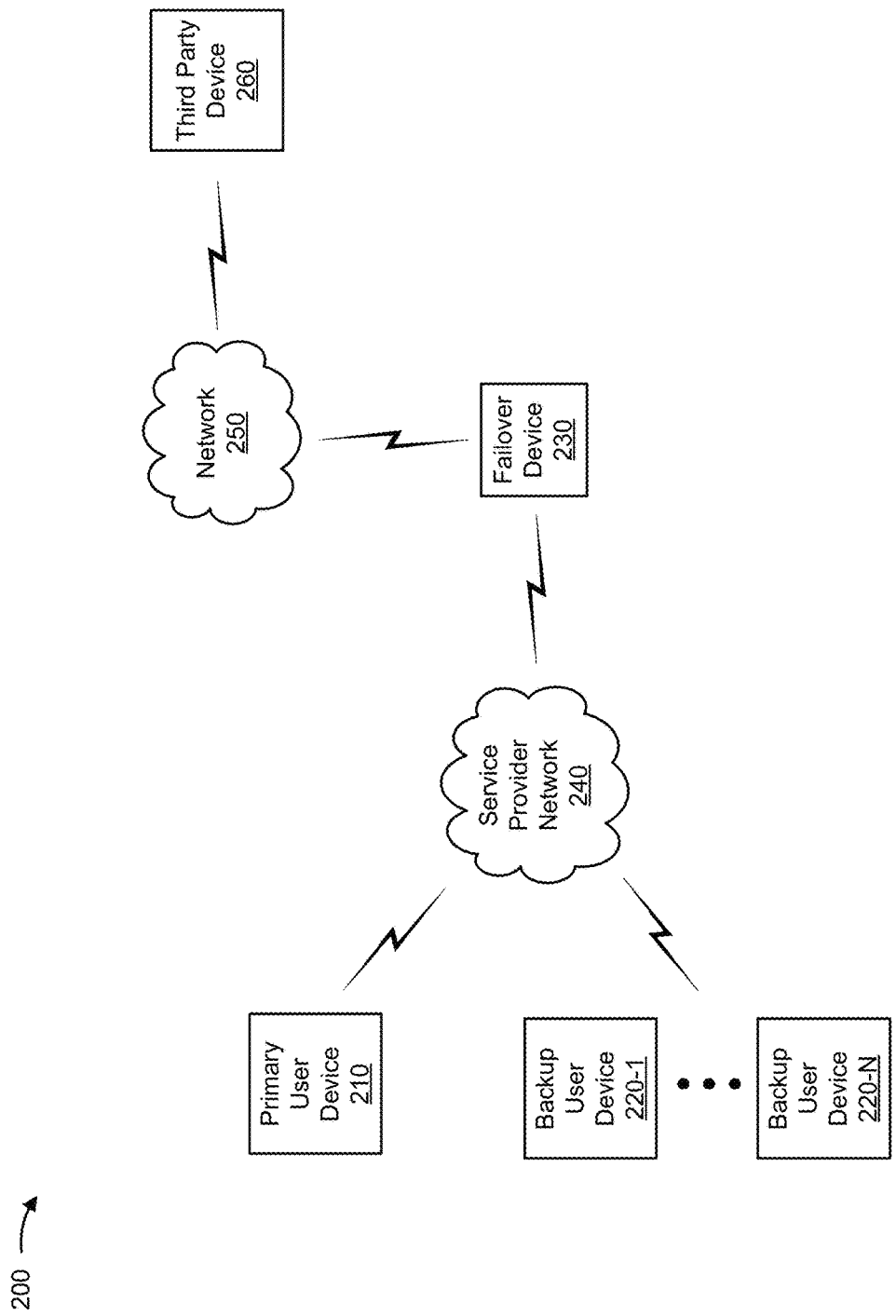
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a primary user device 210, a set of backup user devices 220-1 through 220-N (N≥1) (hereinafter referred to collectively as "backup user devices 220," and individually as "backup user device 220"), a failover device 230, a service provider network 240, a network 250, and a third party device 260.

Primary user device 210 may include a device capable of communicating with service provider network 240. For example, primary user device 210 may include a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or a similar device. In some implementations, primary user device 210 may be capable of receiving (e.g., from failover device 230) and storing information associated with a failover configuration of primary user device 210 and/or backup user device 220. In some implementations, primary user device 210 may be capable of detecting a failover condition associated with primary user device 210 and communicating information associated with the failover condition to failover device 230. In some implementations, primary user device 210 may be capable of receiving services provided via service provider network 240 and/or network 250 (e.g., services associated with a connection with third party device 260).

Backup user device 220 may include a device capable of communicating with a service provider network 240. For example, backup user device 220 may include a wireless communication device, a radiotelephone, a PCS terminal, a PDA, a smart phone, a laptop computer, a tablet computer, a personal gaming system, and/or a similar device. In some implementations, backup user device 220 may be capable of receiving (e.g., from failover device 230) and storing information associated with a failover configuration of backup user device 220 and/or primary user device 210. In some implementations, backup user device 220 may be capable of detecting a failover condition associated with backup user device 220 and communicating information associated with the failover condition to failover device 230. In some implementations, backup user device 220 may be capable of receiving services provided via service provider network 240 and/or network 250 (e.g., services associated with a connection with third party device 260).

Failover device 230 may include a device capable of receiving, generating, processing, storing, and/or providing information associated with a failover configuration of primary user device 210 and/or backup user device 220. For example, failover device 230 may include a server (e.g., a proxy server), a gateway, a router, a modem, a switch, a firewall, a network interface card ("NIC"), a hub, a bridge, an optical add/drop multiplexer ("OADM"), or the like. In some implementations, failover device 230 may include a device capable of receiving information, from primary user device 210 and/or backup user device 220, indicating that a failover condition has been met. Additionally, or alternatively, failover device 230 may include a device capable of determining a service to be provided to backup user device 220 and/or may include a device capable of routing and/or forwarding a service request to backup user device 220. While shown as being located external to service provider network 240, failover device 230 may be may be implemented within service provider network 240. Additionally, or alternatively, failover device 230 may be included within a home subscriber server ("HSS") associated with service provider network 240. Alternatively, failover device 230 may interact with the HSS associated with service provider network 240.

Service provider network 240 may include one or more wired and/or wireless networks. For example, service provider network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, service provider network 240 may be capable of providing a service to primary user device 210 and/or backup user devices 220. In some implementations, service provider network 240 may include failover device 230.

Network 250 may include one or more wired and/or wireless networks. For example, network 250 may include a cellular network, a PLMN, a LAN, a WAN, a MAN, a PSTN, an ad hoc network, an intranet, the Internet, a fiber optic-based network, and/or a combination of these or other types of networks. In some implementations, network 250 may be external to service provider network 240. In some implementations, network 250 may be included in or correspond to service provider network 240. A device associated with network 250 (e.g., third party device 260, etc.) may be capable of communicating with a device associated with service provider network 240 (e.g., primary user device 210, backup user device 220, etc.) via failover device 230.

Third party device 260 may include a device capable of receiving, generating, processing, storing, and/or providing information associated with a service to be provided to primary user device 210 and/or backup user device 220. For example, third party device 260 may be a server device (e.g., an application server, a voice server, etc.) a wireless communication device, a radiotelephone, a PCS terminal, a PDA, a smart phone, a laptop computer, a tablet computer, a personal gaming system, and/or a similar device. In some implementations, third party device 260 may be a device associated with network 250 or service provider network 240. Additionally, or alternatively, third party device 260 may provide a service (e.g., an application service) to primary user device 210 and/or backup user device 220 via service provider network 240 and/or network 250.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
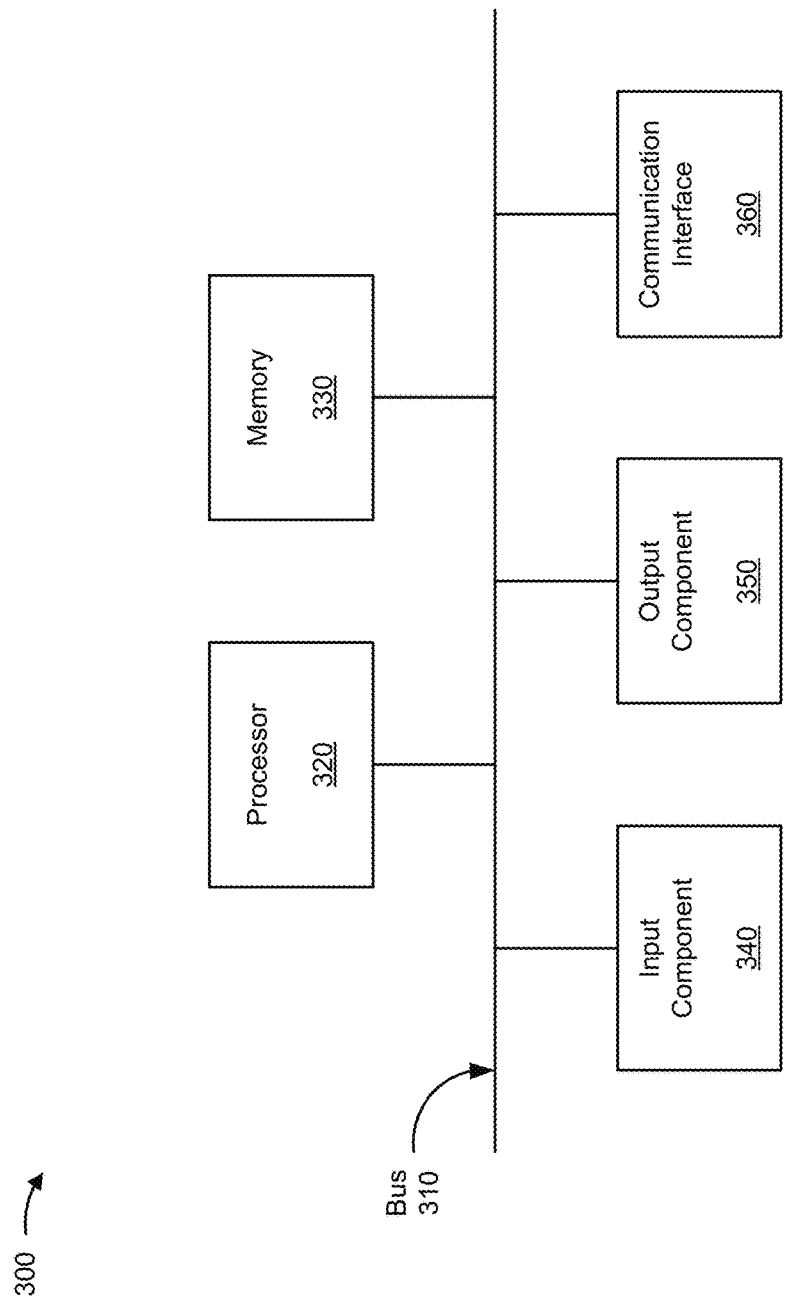
FIG. 3 is a diagram of example components of one or more devices of FIG. 2.

FIG. 3 is a diagram of example components of a device 300. Device 300 may correspond to primary user device 210, backup user device 220, failover device 230, and/or third party device 260. Additionally, or alternatively, each of primary user device 210, backup user device 220, failover device 230, and/or third party device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
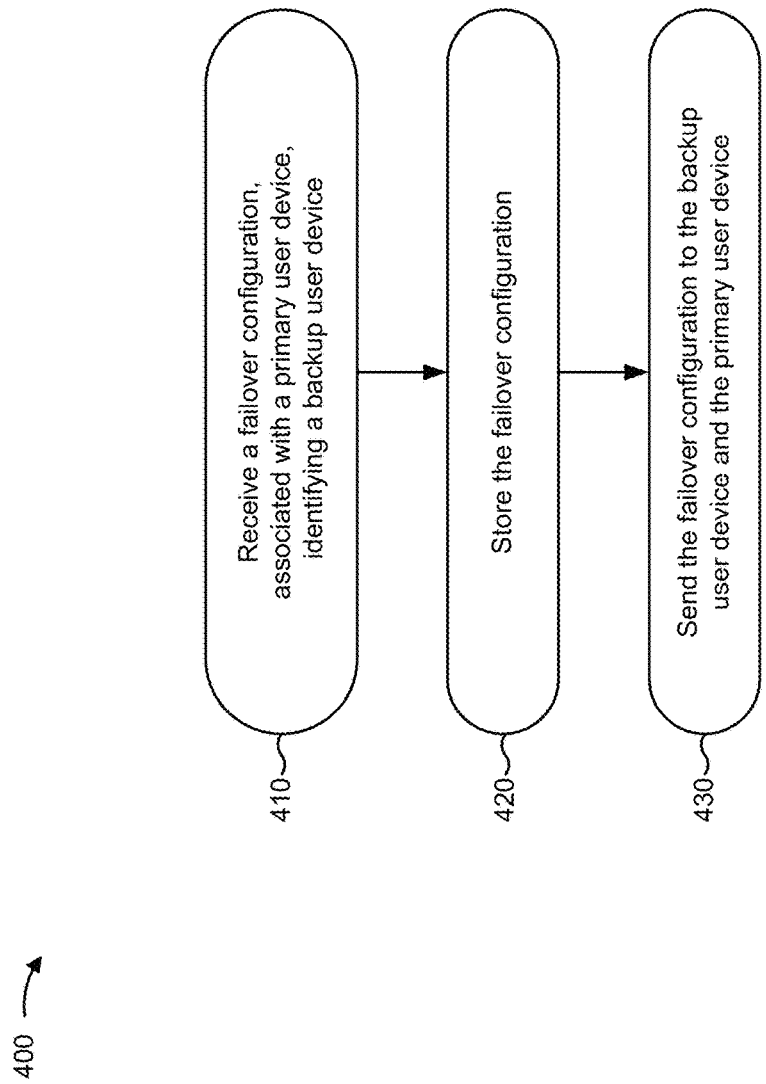
FIG. 4 is a flow chart of an example process for receiving and distributing a failover configuration associated with a user device.

FIG. 4 is a flow chart of an example process 400 for receiving and distributing a failover configuration associated with a user device. In some implementations, one or more process blocks of FIG. 4 may be performed by failover device 230. In some implementations, one or more process blocks of FIG. 4 may be performed by another device or a group of devices separate from or including failover device 230, such as primary user device 210, backup user device 220, and/or third party device 260.

As shown in FIG. 4, process 400 may include receiving a failover configuration, associated with a primary user device, identifying a backup user device (block 410). For example, failover device 230 may receive a failover configuration, associated with primary user device 210, identifying backup user device 220. In some implementations, failover device 230 may receive the failover configuration from primary user device 210 and/or backup user device 220. Additionally, or alternatively, failover device 230 may receive the failover configuration from another device associated with a user of primary user device 210 (e.g., a desktop computer associated with the user, a tablet computer associated with the user, etc.) via service provider network 240 and/or network 250. In some implementations, a user may specify a primary user device 210, one or more backup user devices 220, one or more failover conditions, and/or one or more services to failover.

In some implementations, the failover configuration may include information identifying a primary user device and/or a backup user device. For example, the failover configuration may include one or more user device identifiers that identify a primary user device 210 and/or a backup user device 220 (e.g., a string of characters associated with the user device, an international mobile subscriber identity ("IMSI"), a mobile subscriber integrated services digital network-number ("MSISDN"), a mobile directory number ("MDN"), etc.). Additionally, or alternatively, the failover configuration may include information associated with a user of primary user device 210 and/or backup user device 220 (e.g., a username, an account number, etc.). Additionally, or alternatively, the failover configuration may include information (e.g., a string of characters, etc.) identifying a device type of a user device (e.g., primary, backup, etc.).

In some implementations, the failover configuration may include information indicating a failover priority associated with one or more backup user devices 220. For example, a failover priority may indicate that an attempt to forward a service request to a first backup user device 220 is to be made before an attempt to forward the service request to a second backup user device 220 is to be made (e.g., if the first backup user device 220 cannot be reached, an attempt to reach the second backup user device 220 may be made, etc.).

In some implementations, the failover configuration may identify a hierarchy associated with primary user device 210 and one or more backup user devices 220. For example, the failover configuration may indicate that a service request is to be forwarded to a first backup user device 220 until a first failover condition, associated with the first backup user device 220, is satisfied. The failover configuration may also indicate that the service request is to be forwarded to a second backup user device 220 when a second failover condition, associated with the first backup user device 220, has been satisfied.

In some implementations, the failover configuration may include information identifying a failover condition that, when satisfied, may cause failover device 230 to forward a service request, associated with a service provided by service provider network 240, to a backup user device 220 rather than primary user device 210 (e.g., the service will failover from primary user device 210 to backup user device 220). For example, the failover configuration may indicate that a service request is to be forwarded to a first backup user device 220 when a failover condition, associated with primary user device 210, is satisfied. Additionally, or alternatively, the failover configuration may indicate that the service request is to be forwarded to a second backup user device 220 when a failover condition, associated with the first backup user device 220, is satisfied.

A failover condition, as used herein, may include an event (e.g., when a threshold condition is satisfied) that causes a service request, destined for a user device (e.g., primary user device 210), to be forwarded to another user device (e.g., backup user device 220). For example, a failover condition may include detecting that a primary user device 210 or backup device 220 is unavailable, (e.g., is powered off, is out of a service area, etc.), has a quantity of resources available that satisfies a threshold (e.g., a low battery level, a low amount of available memory, a low signal strength, etc.), is unable to connect to service provider network 240 (e.g., is roaming nationally, is roaming internationally, etc.), or the like. In some implementations, the failover configuration may include information identifying one or more failover conditions associated with primary user device 210 and/or one or more backup user devices 220.

In some implementations, the failover configuration may include information identifying a service that is to failover to a backup user device (e.g., a service request may be forwarded to backup user device 220). A service, as used herein, may include a service, provided via a network (e.g., service provider network 240, network 250, etc.), that may be provided to one or more devices (e.g., primary user device 210, backup user device 220, etc.) associated with the network. The service that may failover may include a service provided by service provider network 240 to primary user device 210 (e.g., a voice service, a messaging service, an application service, a multimedia service, etc.). In some implementations, the failover configuration may include information identifying one or more services that are to failover to backup user device 220.

In some implementations, the failover configuration may include information indicating that a service request is to be forwarded to a first backup user device 220, while another service request is to be forwarded to a second backup user device 220. For example, the failover configuration my include information indicating that a service request (e.g., a service request associated with a voice service) is to be forwarded to a first backup user device 220, while the failover configuration may indicate that a different service request (e.g., a service request associated with an application service) is to be forwarded to a second backup user device 220.

In some implementations, the failover configuration may include information identifying a service to failover from a primary user device 210 (e.g., the failover is configured from the perspective of primary user device 210). Additionally, or alternatively, the failover configuration may include information identifying a service that is to failover to backup user device 220 (e.g., the failover is configured from the perspective of backup user device 220).

As further shown in FIG. 4, process 400 may include storing the failover configuration (block 420). For example, failover device 230 may store the failover configuration in a data structure. In some implementations, failover device 230 may store information associated with the failover configuration, such as a user device identifier (e.g., a string of characters, an IMSI, an MSISDN, an MDN, etc.), that identifies a primary user device 210 or a backup user device 220 associated with the failover configuration. In some implementations, failover device 230 may store the failover configuration in a memory location (e.g., a RAM, a hard disk, etc.) associated with primary user device 210 and/or backup user device 220.

As further shown in FIG. 4, process 400 may include sending the failover configuration to the backup user device and the primary user device (block 430). For example, failover device 230 may send the failover configuration to primary user device 210 and/or may send the failover configuration to backup user device 220.

In some implementations, failover device 230 may send the failover configuration to primary user device 210 and/or backup user device 220 based on failover device 230 receiving and/or storing the failover configuration. Additionally, or alternatively, failover device 230 may send the failover configuration to primary user device 210 and/or backup user device 220 based on receiving an updated failover configuration from primary user device 210, backup user device 220, or another device associated with the failover configuration (e.g., a desktop computer used to update the failover configuration, etc.). Additionally, or alternatively, failover device 230 may send the failover configuration to primary user device 210 and/or backup user device 220 when primary user device 210 and/or backup user device 220 connects to service provider network 240 (e.g., when a user device is powered on, when a user device establishes a network connection, etc.).

In some implementations, primary user device 210 and/or backup user device 220 may store the failover configuration in a memory of primary user device 210 and/or backup user device 220 (e.g., a universal integrated circuit card ("UICC"), a RAM, a hard disk, etc.) when the failover configuration is received from failover device 230.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks of process 400 may be omitted in some implementations.

FIG. 5 is a diagram of an example data structure 500 that stores a failover configuration associated with a user device. Data structure 500 may be stored in a memory device (e.g., a UICC, a RAM, a hard disk, etc.) associated with one or more devices and/or components of FIG. 2 and/or FIG. 3. For example, data structure 500 may be stored by failover device 230, primary user device 210, and/or backup user device 220.

As shown in FIG. 5, data structure 500 may include a collection of fields, such as a user device identifier field 510, a device type field 520, a failover priority field 530, a service field 540, and a failover condition field 550.

User device identifier field 510 may store information that identifies a user device associated with a failover configuration. For example, user device identifier field 510 may store information identifying primary user device 210 or backup user device 220 using a string of characters (e.g., PUD, BUD1, BUD2, etc.), an IMSI associated with primary user device 210 or backup user device 220, an MSISDN associated with primary user device 210 or backup user device 220, an MDN associated with primary user device 210 or backup user device 220, or the like.

Device type field 520 may store information that identifies a type of user device associated with the user device identified in user device identifier field 510. For example, device type field 520 may store information indicating that a user device, identified in user device identifier field 510, is a primary user device (e.g., "Primary"), may store information indicating that the user device is a backup user device (e.g., "Backup"), or the like.

Failover priority field 530 may store information that identifies a priority level associated with the user device identified in user device identifier field 510. For example, failover priority field 530 may store information indicating that a user device has a priority level below another user device (e.g., a priority level of 2 may indicate that a service should failover to the user device if a failover condition is detected for a user device with a priority level of 1, etc.). As an additional example, failover priority field 530 may include information indicating that the user device, identified in user device identifier field 510, has a priority level above another user device (e.g., a priority level of 2 may indicate that a service should failover to the user device before the service fails over to a user device with a priority level of 3, etc.).

Service field 540 may store information that identifies a service that is to failover (e.g., a service request, associated with the service, is to be forwarded) to the user device identified in user device identifier field 510. For example, service field 540 may include information identifying a voice service, a messaging service (e.g., a short message service ("SMS"), etc.), an application service (e.g., a social networking application, etc.), a multimedia service (e.g., a video conferencing service, etc.), or the like. Additionally, or alternatively, service field 540 may store information identifying a user profile associated with a user of the user device identified in user device identifier field 510. For example, service field 540 may store information identifying a user account associated with the service (e.g., a username, a password, etc.), a user profile associated with the service (e.g., a list of contacts, biographical information of the user, etc.), or the like.

Failover condition field 550 may store information that identifies a failover condition associated with the user device identified by user device identifier field 510. For example, failover condition field 550 may store information indicating that failover from the user device is to occur when the user device is unavailable, (e.g., is powered off, is out of a service area, etc.), has a quantity of resources available that satisfies a threshold (e.g., a low battery level, a low amount of available memory, etc.), is unable to connect to service provider network 240 (e.g., is roaming, etc.), or the like.

Information associated with a failover configuration may be conceptually represented as a group of rows in data structure 500. For example, the first row of data structure 500 may correspond to a failover configuration associated with a user device, identified as PUD, that is a primary user device, and has a priority level of 1 (e.g., PUD may be the primary user device associated with a user and will be provided with a standard group of services associated with a service provider network account of the user). As further shown in the first row of data structure 500, a failover to a backup user device may take place when PUD has 10% battery life remaining and/or when PUD is powered off. A service may failover from PUD to BUD1 based on the priority associated with PUD (e.g., 1) and BUD1 (e.g., 2).

As further shown in FIG. 5, the second row in data structure 500 may correspond to a failover configuration associated with another user device, identified as BUD1, that is a backup user device, and has a priority level of 2 (e.g., a service may failover from PUD to BUD1). As further shown, BUD1 may be provided with a voice service, a text service, and a VideoCall service, and a failover to another backup user device (e.g., BUD2) may take place when BUD1 is at a location where there is no coverage provided by the service provider network. A service may failover from BUD1 to BUD2 based on the priority associated with BUD1 (e.g., 2) and BUD2 (e.g., 3).

As further shown in FIG. 5, the third row in data structure 500 may correspond to a failover configuration associated with another user device, identified as BUD2, that is a backup user device, and has a priority level of 3 (e.g., a service may failover from BUD1 to BUD2). As further shown, BUD2 may be provided with the VideoCall service. As shown, a failover condition for BUD2 may not be specified (e.g., there is no backup user device with a lower priority than BUD2).

Data structure 500 includes fields 510-550 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6A:
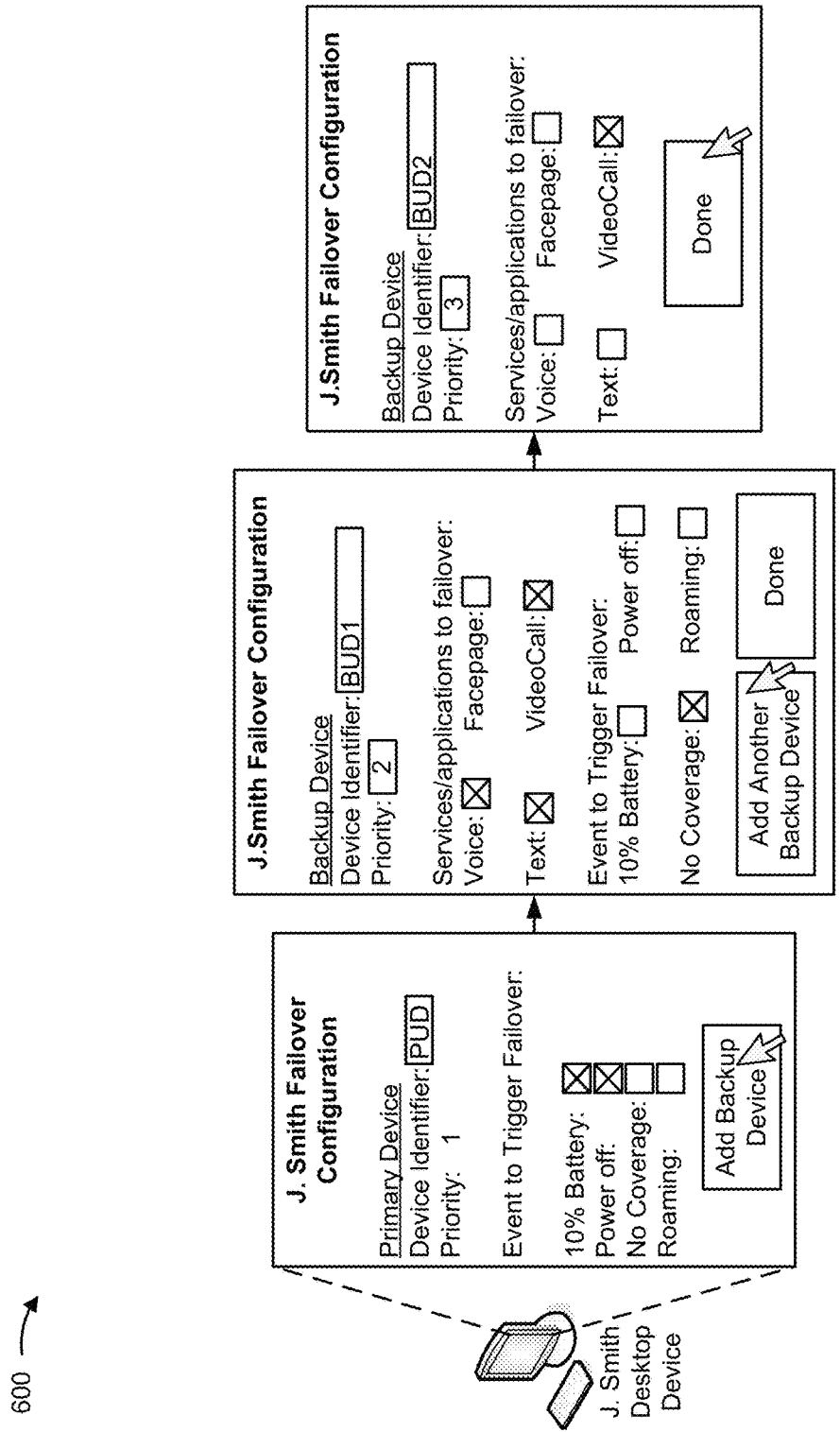
FIGS. 6A and 6B are diagrams of an example implementation relating to the example process shown in FIG. 4.
Figure 6B:
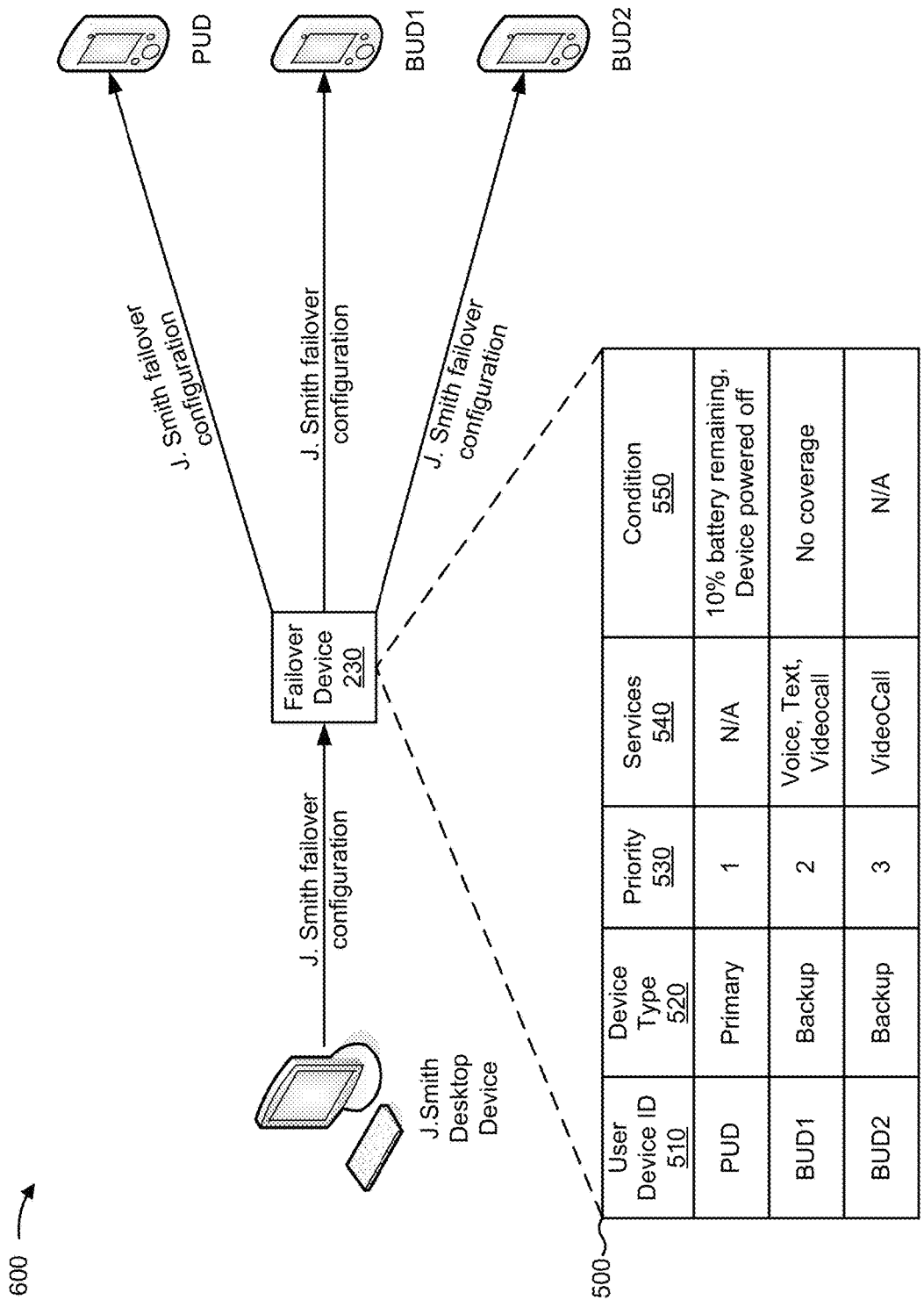

FIGS. 6A and 6B are diagrams of an example implementation 600 relating to example process 400 shown in FIG. 4. For the purposes of example implementation 600, assume that a user, J. Smith, is using a desktop device to access a website, associated with a service provider network, to input information identifying a failover configuration associated with three devices owned by the user. Further, assume that the user has an existing account with the service provider network that allows the service provider network to provide one or more services to one or more user devices associated with the user.

As shown in FIG. 6A, the user may interact with a user interface displayed on a display screen of the desktop device to provide information associated with a failover configuration. For example, a first user interface may display information associated with the primary user device associated with the user (e.g., the first device associated with the failover configuration may automatically be identified as the primary user device). As shown, the user may interact with an input element (e.g., a textbox, etc.) to indicate that a device identifier of the primary user device is "PUD," as shown. The user may also interact with an input element (e.g., a checkbox, etc.) to indicate that a failover to a first backup user device is to occur when PUD reaches a battery level of 10% and/or when PUD is powered off. As shown, the user may choose to provide failover information associated with a first backup user device (e.g., by clicking an "Add Backup user device" button).

As further shown in FIG. 6A, the user may interact with a second user interface displayed on a display screen of the desktop device to provide information associated with a failover configuration of a first backup user device. For example, the second user interface may display information associated with the first backup user device associated with the user. As shown, the user may interact with an input element (e.g., a textbox, etc.) to indicate that a device identifier of the first backup user device is "BUD1," as shown. Further, the user may interact with an input element (e.g., a textbox, etc.) to indicate that the priority level of the first backup user device is 2. As shown, the user may also interact with an input element (e.g., a checkbox, etc.) to indicate that a service request associated with a voice service, a text service, and/or a VideoCall service are to be forwarded to BUD1 when a failover from PUD to BUD1 occurs. As further shown, the user may also interact with an input element (e.g., a checkbox, etc.) to indicate that a failover to a second backup user device is to take place when BUD1 is outside of a coverage area of the service provider network. As shown, the user may choose to provide failover information associated with a second backup user device (e.g., by clicking an "Add Another Backup user device" button).

As further shown in FIG. 6A, the user may interact with a third user interface displayed on a display screen of the desktop device to provide information associated with a failover configuration of a second backup user device. For example, the third user interface may display information associated with the second backup user device associated with the user. As shown, the user may interact with an input element (e.g., a textbox, etc.) to indicate that a device identifier of the second backup user device is "BUD2," as shown. Further, the user may interact with an input element (e.g., a textbox, etc.) to indicate that the priority level of the second backup user device is 3. As shown, the user may also interact with an input element (e.g., a checkbox, etc.) to indicate that a service request associated with the VideoCall service is to be forwarded to BUD2 when a failover from BUD1 to BUD2 occurs. As further shown, the user may choose to complete the failover configuration for the PUD, BUD1, and BUD2 user devices (e.g., by clicking a "Done" button).

As shown in FIG. 6B, the desktop device may provide the failover configuration, associated with J. Smith, to failover device 230, and failover device 230 may store the failover configuration in data structure 500. As further shown, failover device 230 may send the failover configuration to the PUD, BUD1, and BUD2 user devices based on receiving the failover configuration from the desktop device.

As indicated above, FIGS. 6A and 6B are provided merely as an example. Other examples are possible and may differ from what was described with regard to FIGS. 6A and 6B.

FIG. 7 is a flow chart of an example process for identifying a backup user device and forwarding a service request to the backup user device. In some implementations, one or more process blocks of FIG. 7 may be performed by failover device 230. In some implementations, one or more process blocks of FIG. 7 may be performed by another device or a group of devices separate from or including failover device 230, such as primary user device 210, backup user device 220, and/or third party device 260.

As shown in FIG. 7, process 700 may include determining that a failover condition, associated with a user device, has been satisfied (block 710). For example, failover device 230 may determine that a failover condition, associated with primary user device 210, has been satisfied. As another example, failover device 230 may determine that a failover condition, associated with backup user device 220, has been satisfied.

In some implementations, failover device 230 may determine that a failover condition has been satisfied based on information received from primary user device 210 or backup user device 220. For example, primary user device 210 or backup user device 220 may determine that a failover condition (e.g., a low battery life, a low signal strength, etc.) has been satisfied, and may provide information (e.g., to failover device 230) indicating that the failover condition has been satisfied. Additionally, or alternatively, primary user device 210 or backup user device 220 may determine a failover condition has been satisfied, and may provide information indicating that the failover condition has been satisfied to the user of the user device via a display screen associated with the user device. Additionally, or alternatively, failover device 230 may determine that a failover condition has been satisfied based on information received, from primary user device 210 or backup user device 220, at a specified interval of time (e.g., every 30 min, every 60 min, etc.) that may indicate device conditions (e.g., a battery level, a signal strength, etc.) associated with primary user device 210 or backup user device 220.

In some implementations, primary user device 210 or backup user device 220 may automatically provide information, to failover device 230, indicating that the failover condition has been satisfied. Additionally, or alternatively, the user device may prompt the user to choose whether to notify failover device 230 that the failover condition has been satisfied, and failover device 230 may determine that a failover condition has been satisfied based on a response of the user indicating that failover device 230 should be notified that the failover condition has been satisfied.

In some implementations, primary user device 210 or backup user device 220 may detect that a first failover condition has been satisfied (e.g., 20% battery life remaining) and the user device may prompt the user whether to notify failover device 230, whereas the user device may automatically notify failover device 230 when a second failover condition of the user device (e.g., 10% battery life remaining) has been satisfied. Additionally, or alternatively, primary user device 210 or backup user device 220 may detect that the first failover has been satisfied, and may periodically (e.g., every 5 minutes, every 10 minutes, etc.) prompt the user to choose whether to report that a failover condition (e.g., a low battery level) has been satisfied to failover device 230 until the second failover condition has been satisfied (e.g., the user device may automatically notify failover device 230 that the second threshold condition has been satisfied).

In some implementations, failover device 230 may determine that a failover condition has been satisfied based on information received from another device, such as an HSS associated with service provider network 240. For example, activity associated with primary user device 210 or backup user device 220 may satisfy a failover condition (e.g., the user device may be powered off, etc.), and the HSS may provide information, to failover device 230, indicating that the failover condition has been satisfied.

As further shown in FIG. 7, process 700 may include identifying a backup user device associated with the user device (block 720). For example, failover device 230 may identify backup user device 220 associated with primary user device 210. As an additional example, failover device 230 may identify a second backup user device 220 associated with a first backup user device 220.

In some implementations, failover device 230 may identify backup user device 220 based on information stored by failover device 230 in data structure 500. In some implementations, failover device 230 may identify one or more backup user devices 220 associated with primary user device 210, and failover device 230 may identify an order and/or a priority associated with the one or more backup user devices 220 (e.g., based on a failover configuration stored in a data structure, etc.).

In some implementations, failover device 230 may identify backup user device 220 based on input from a user. For example, primary user device 210 may prompt a user to identify a backup user device 220 (e.g., by choosing from a list, by entering a user device identifier, etc.), and primary user device 210 may provide information identifying backup user device 220 to failover device 230. Additionally, or alternatively, failover device 230 may identify backup device 220 based on the failover condition being satisfied by primary user device 210. Additionally, or alternatively, failover device 230 may identify backup user device 220 based on the service to be failed over to backup user device 220. In some implementations, failover device 230 may identify a backup user device 220 based on a capability of backup user device 220. For example, failover device 230 may identify a first backup user device 220 (e.g., a mobile phone) to receive a service (e.g., an application service) where the first backup user device 220 is capable of receiving the service (e.g., the application associated with the application service is installed on the mobile phone). Alternatively, failover device 230 may not identify a second backup user device 220 (e.g., a tablet) to receive the service where the second backup user device 220 is not capable of receiving the service (e.g., where the application associated with the application service is not installed on the tablet.).

As further shown in FIG. 7, process 700 may include determining that a service request, associated with a service, is to be forwarded to the backup user device (block 730). For example, failover device 230 may determine that a service request is to be forwarded to backup user device 220. In some implementations, failover device 230 may determine that a service request is to be forwarded to backup user device 220 based on whether backup user device 220 can be reached by failover device 230 and/or another device associated with service provider network 240. In some implementations, failover device 230 may determine that backup user device 220 can be reached, and backup user device 220 may prompt a user of backup user device 220 to choose whether the service request is to be forwarded to backup user device 220. Failover device 230 may determine that the service request is to be forwarded to backup user device 220 based on a response from the user indicating that the service request is to be forwarded to backup user device 220. In some implementations, the response from the user may indicate that a first type of service request (e.g., a service request associated with a voice service) is to be forwarded to backup user device 220, and may indicate that a second type of service request (e.g., a service request associated with an application service) is not to be forwarded to backup device 220.

In some implementations, failover device 230 may determine that a service request is not to be forwarded to a first backup user device 220 (e.g., when the first backup user device 220 is turned off, when the first backup user device 220 is not in a coverage area, etc.). Failover device 230 may then determine that the service request is to be forwarded to a second backup user device 220 in the same manner as discussed above. In some implementations, failover device 230 may determine that the service request is not to be forwarded to any backup user device 220 (e.g., if all backup user devices 220 are unreachable).

In some implementations, failover device 230 may determine (e.g., based on a failover configuration, based on user input, etc.) that a service request associated with a first service is to be forwarded to backup user device 220, while a service request associated with a second service is not to be forwarded (e.g., service provider network 240 may continue to provide the second service to primary user device 210).

As further shown in FIG. 7, process 700 may include providing user information, associated with the service, to the backup user device (block 740). For example, failover device 230 may provide user information, associated with the service, to backup user device 220. In some implementations, failover device 230 may provide user information associated with the service (e.g., an application service, etc.) that may allow backup user device 220 to access an account associated with the service (e.g., a username, a password, etc.). Additionally, or alternatively, failover device 230 may provide user information associated with a user profile (e.g., a list of contacts, a user preference, etc.) that may be associated with the service.

In some implementations, failover device 230 may provide the user information based on information stored by failover device 230 (e.g., the user information may be included in the failover configuration sent to failover device 230). Additionally, or alternatively, failover device 230 may provide the user information based on information stored by primary user device 210 and/or stored by backup user device 220. For example, failover device 230 may receive user information from the user device (e.g., primary user device 210, a first backup user device 220, etc.) that has detected a failover condition, and may provide the user information to backup user device 220 that is to receive the forwarded service request.

As further shown in FIG. 7, process 700 may include forwarding a service request, associated with the service, to the backup user device (block 750). For example, failover device 230 may forward a service request, associated with the service, to backup user device 220. In some implementations, failover device 230 may forward the service request based on receiving the service request via service provider network 240. In some implementations, failover device 230 may act as an intermediary (e.g., a proxy device, etc.) between backup user device 220 and a device associated with the service (e.g., third party device 260, a device included in service provider network 240, etc.) in order to process the service request. In some implementations, failover device 230 may instruct one or more devices, associated with service provider network 240, to forward the service request (e.g., rather than failover device 230 forwarding the service request).

A service request, as used herein, may include a request to connect a user device to send and/or receive information (e.g., a voice call request, a messaging request, a request associated with an application service, etc.). In some implementations, the service request may be associated with continuing a connection, associated with the service, that may have been initiated using primary user device 210 (e.g., a voice call between third party device 260 and primary user device 210 may be forwarded to backup user device 220 without the need for backup user device 220 to reconnect with third party device 260, etc.). Alternatively, third party device 260 may make a new service request (e.g., an attempt to connect, etc.) to primary user device 210 (e.g., via service provider network 240 and/or network 250), and failover device 230 may forward the service request to backup user device 220.

Although FIG. 7 shows example blocks of process 700, in some implementations, process 700 may include additional blocks, different blocks, fewer blocks, or differently arranged blocks than those depicted in FIG. 7. Additionally, or alternatively, one or more of the blocks of process 700 may be performed in parallel. Further, one or more blocks of process 700 may be omitted in some implementations.

Figure 8A:
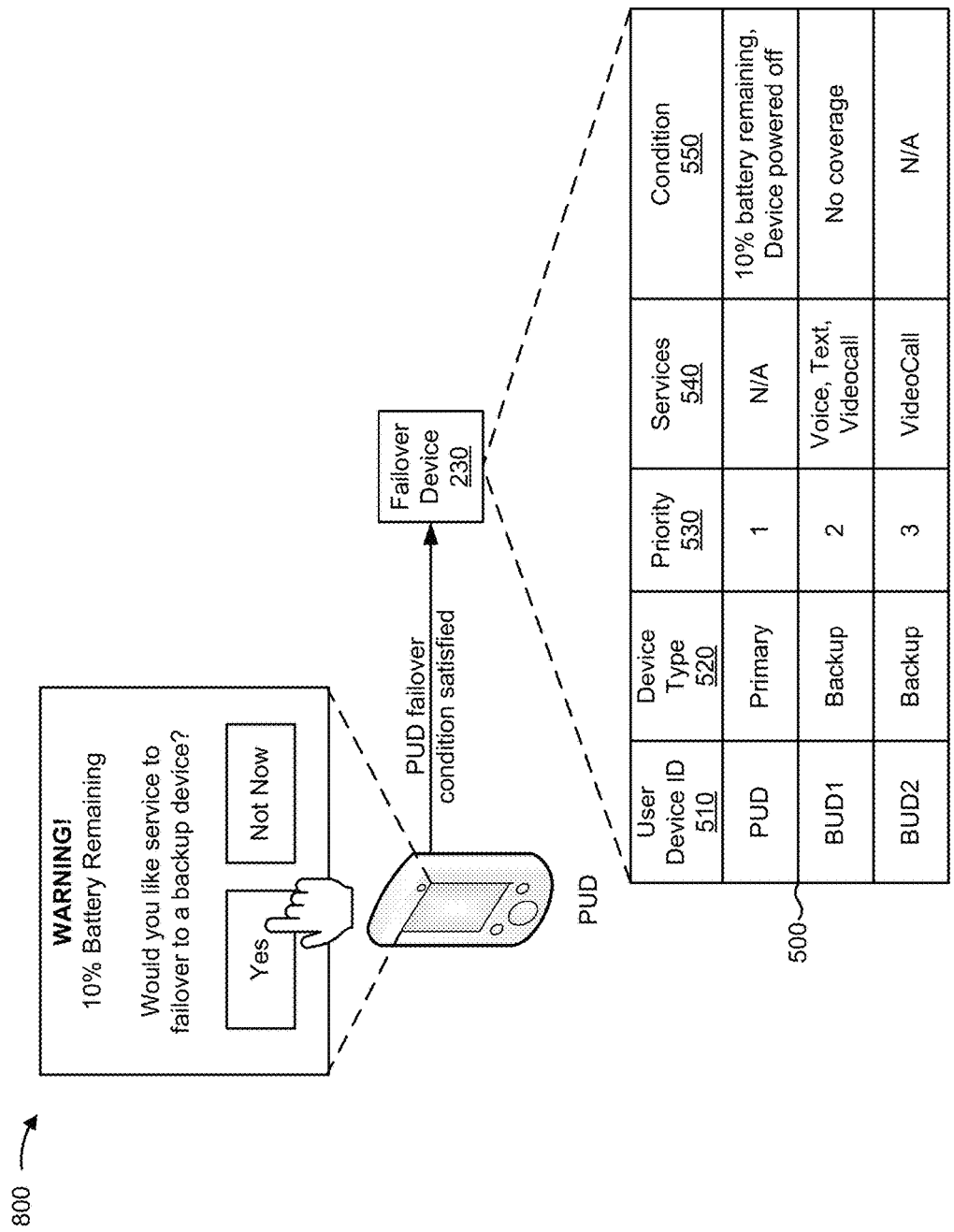
FIGS. 8A-8C are diagrams of an example implementation relating to the example process shown in FIG. 7.
Figure 8B:
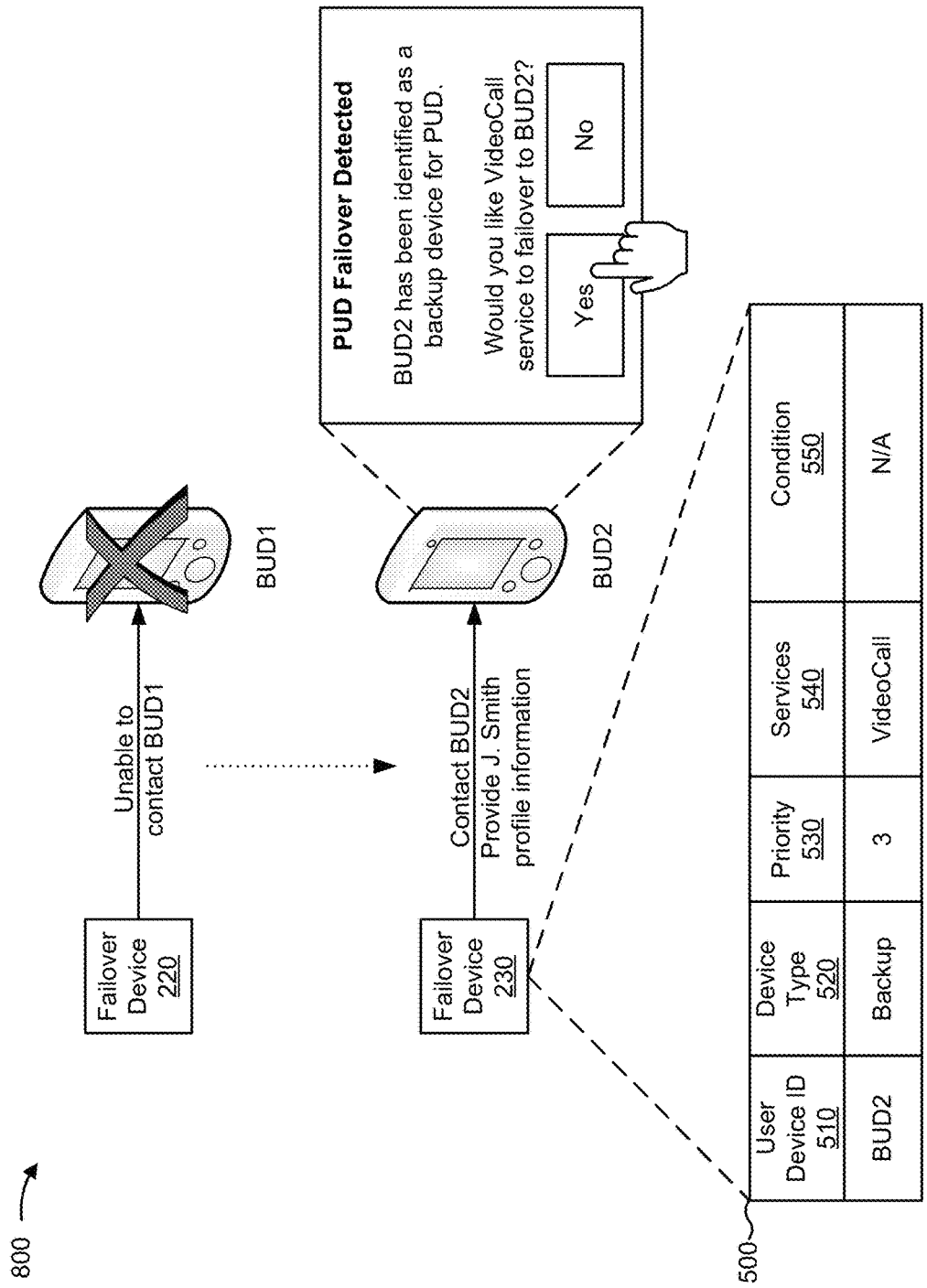
Figure 8C:
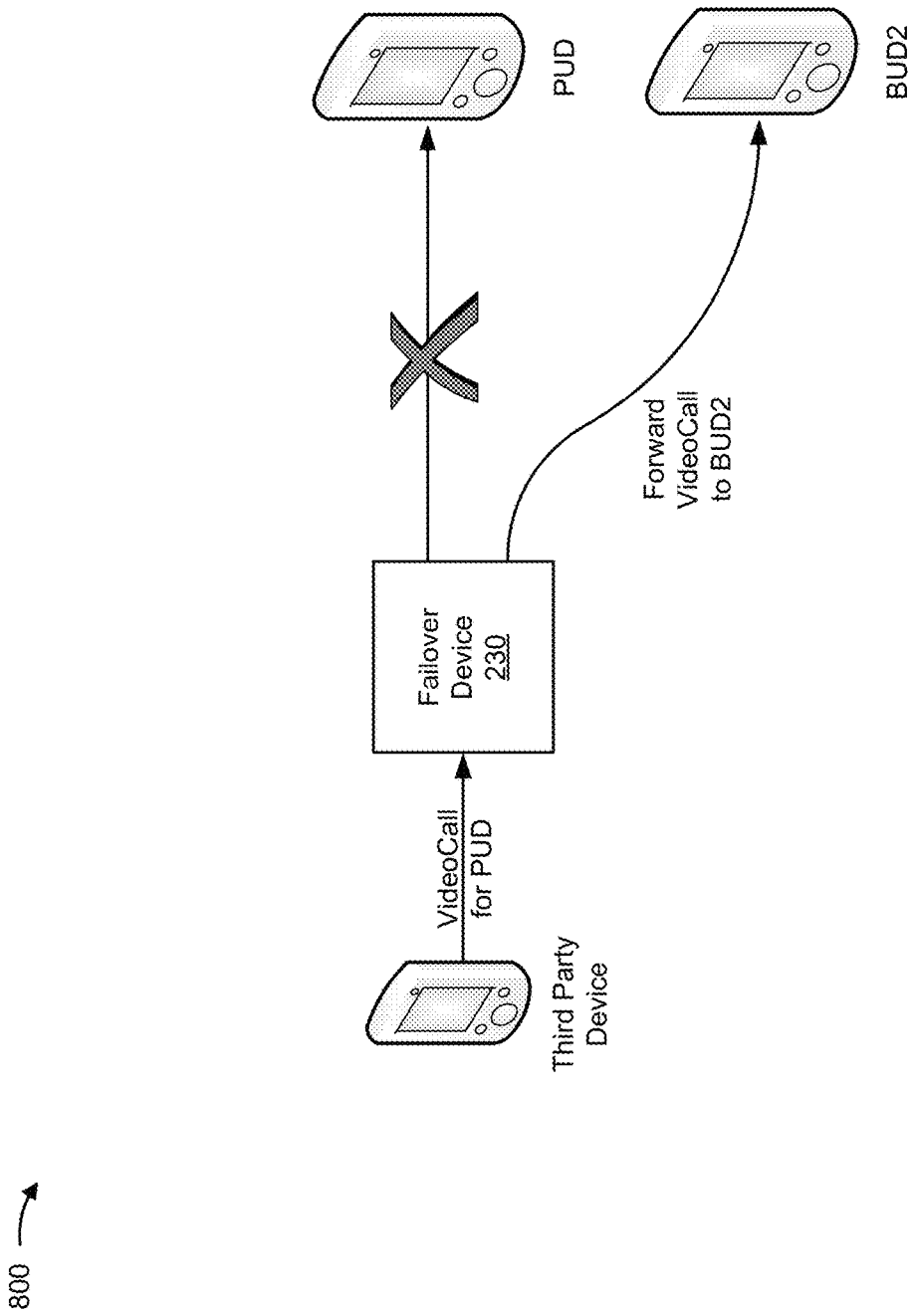

FIGS. 8A-8C are diagrams of an example implementation relating to example process 700 shown in FIG. 7. For the purposes of example implementation 800, assume that a user, J. Smith, has provided a failover configuration associated with a primary user device, PUD, and two backup user devices, BUD1 and BUD2. Further, assume that the failover configuration is stored by PUD and failover device 230.

As shown in FIG. 8A, primary user device PUD may determine that the remaining battery level of PUD has reached 10%, and may determine that a failover condition associated with the remaining battery level has been satisfied (e.g., based on the failover configuration stored by PUD). As shown, PUD may prompt the user of PUD to choose whether a service is to failover to a backup user device, and the user of PUD may indicate that service is to failover to the backup user device (e.g., by selecting a "Yes" button). As shown, PUD may provide information, to failover device 230, indicating that the failover condition has been satisfied.

As further shown in FIG. 8A, failover device 230 may identify two backup user devices, BUD1 and BUD2, associated with PUD based on information associated with the failover configuration stored in data structure 500. As shown, the failover configuration may indicate that a voice service, a text messaging service, and a VideoCall service are to failover to BUD1, may indicate that BUD1 has a priority level of 2, and may indicate that BUD1 is to determine that a failover condition of BUD1 has been satisfied when BUD1 is outside of a coverage area associated with service provider network 240. As further shown, the failover configuration may indicate that only the Video-Call service is to failover to BUD2, and may indicate that BUD2 has a priority level of 3. Failover device 230 may determine that an attempt to forward a service request to BUD1 should be made before an attempt to forward a service request to BUD2 based on the priority levels assigned to BUD1 and BUD2 (e.g., 2 and 3, respectively).

As shown in FIG. 8B, failover device 230 may attempt to contact BUD1 to initiate the provision of the services identified in the failover configuration (e.g., the voice service, the text messaging service, the VideoCall service). As shown, failover device 230 may be unable to contact BUD1 (e.g., BUD1 may be powered off, etc.). As further shown, failover device 230 may attempt to contact BUD2 based on failover device 230 being unable to contact BUD1.

As shown, failover device 230 may successfully contact BUD2. BUD2 may provide an indication to the user that BUD2 has been identified as a backup user device for PUD, and may prompt the user to choose whether the VideoCall service is to failover to BUD2, as shown. As further shown in FIG. 8B, the user of BUD2 may indicate that the VideoCall service is to failover to BUD2 (e.g., by selecting a "Yes" button). Failover device 230 may then provide profile information associated with the VideoCall service (e.g., a username, a password, etc.) to BUD2, as shown. BUD2 may initiate a VideoCall application, associated with the VideoCall service, using the profile information provided by failover device 230.

As shown in FIG. 8C, a third party device may request to initiate a VideoCall session with PUD using the VideoCall service. As shown, the request may be received by failover device 230, and failover device 230 may forward the request to BUD2 (e.g., rather than forwarding the request to PUD). The VideoCall connection may be established between the third party device and BUD2.

Alternatively, the VideoCall session between the third party device and PUD may be in progress when the failover condition associated with PUD is satisfied, and failover device 230 may transfer the VideoCall session to BUD2 (e.g., without the need to terminate the existing session and initiate a new session).

As indicated above, FIGS. 8A-8C are provided merely as an example. Other examples are possible and may differ from what was described with regard to FIGS. 8A-8C.

Figure 9A:
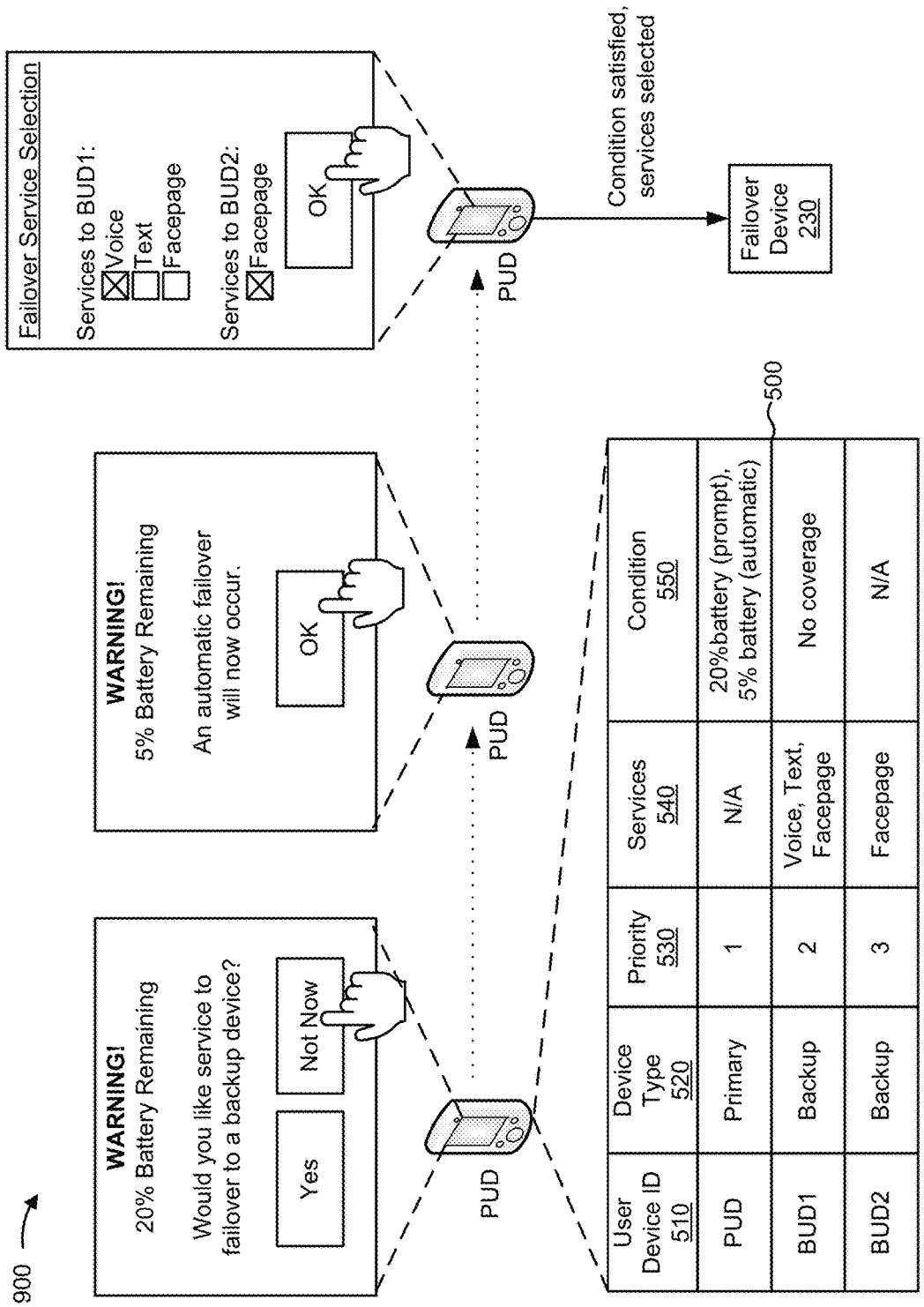
FIGS. 9A-9C are diagrams of an additional example implementation relating to the example process shown in FIG. 7.
Figure 9B:
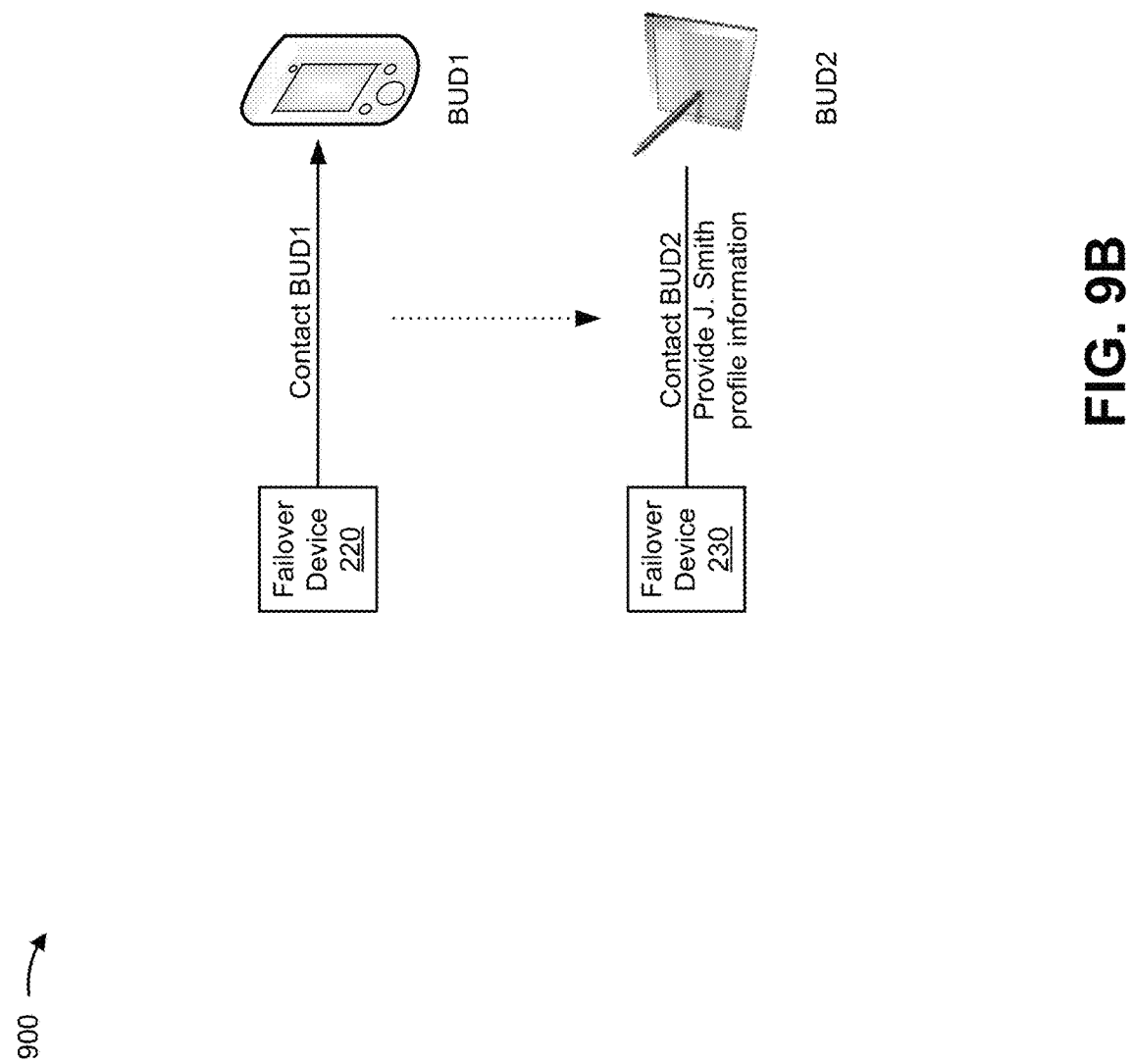
Figure 9C:
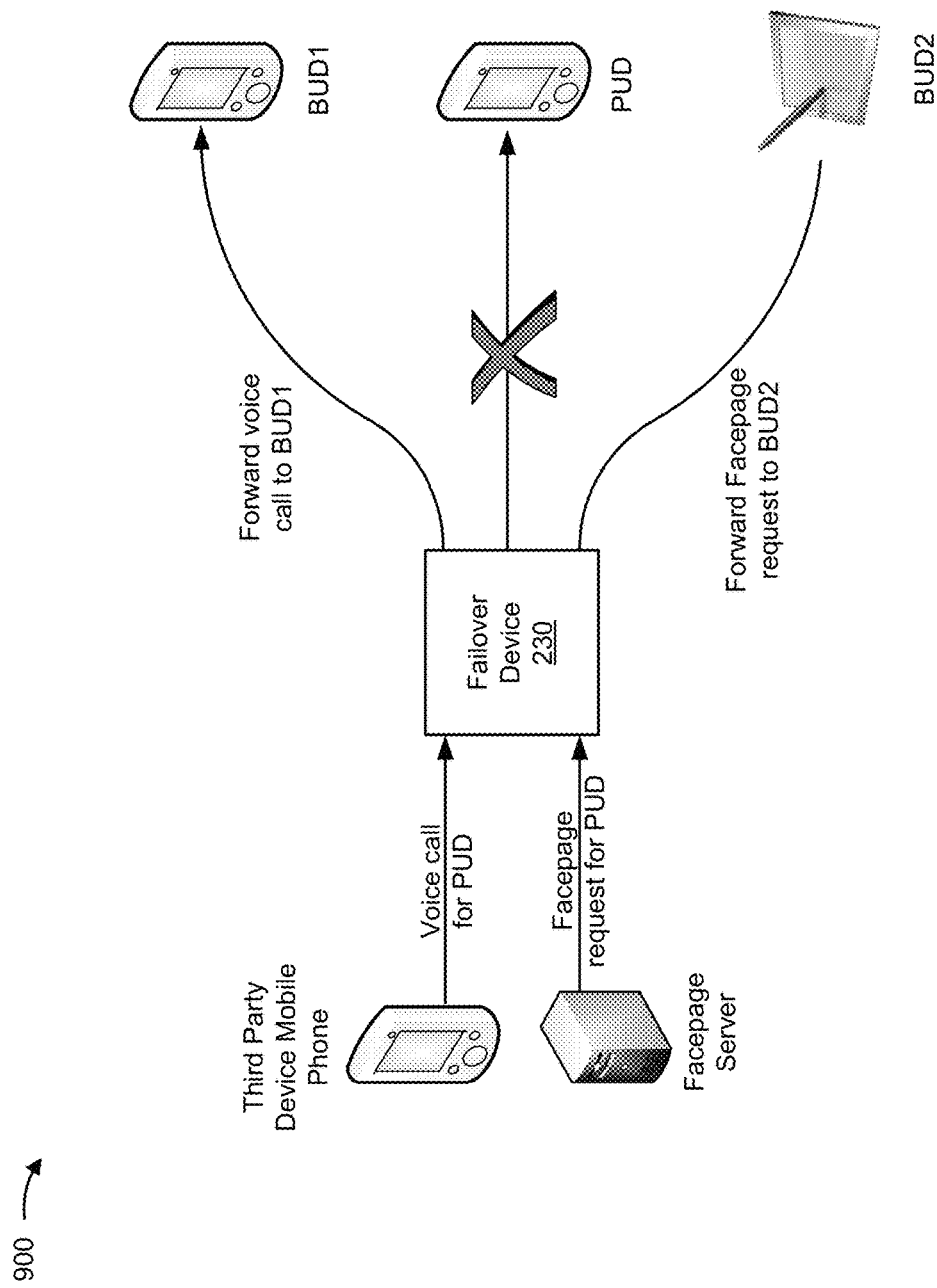

FIGS. 9A-9C are diagrams of an additional example implementation 900 relating to example process 700 shown in FIG. 7. For the purposes of example implementation 900, assume that a user, J. Smith, has provided a failover configuration associated with a primary user device, PUD, and two backup user devices, BUD1 and BUD2. Further, assume that the failover configuration is stored by PUD and failover device 230.

As shown in FIG. 9A, primary user device PUD may determine that the remaining battery level of PUD has reached 20%, and may determine that a first failover condition associated with the remaining battery level has been satisfied (e.g., based on the failover configuration stored by PUD). As shown, PUD may prompt the user of PUD to choose whether service is to failover to a backup user device, and the user of PUD may indicate that service is not to failover to the backup user device (e.g., by selecting a "No" button).

As further shown in FIG. 9A, PUD may determine that the remaining battery level of PUD has reached 5%, and may determine that a second failover condition associated with the remaining battery level has been satisfied. As shown, PUD may notify the user of PUD that service will be automatically switched to a backup user device.

As further shown in FIG. 9A, PUD may identify two backup user devices, BUD1 and BUD2, associated with PUD based on information associated with the failover configuration stored in data structure 500. As shown, the failover configuration may indicate that a voice service, a text messaging service, and a Facepage service may failover to BUD1, may indicate that BUD1 has a priority level of 2, and may indicate that BUD1 is to determine that a failover condition of BUD1 has been satisfied when BUD1 is outside of a coverage area associated with service provider network 240. As further shown, the failover configuration may indicate that only the Facepage service is to failover to BUD2, and may indicate that BUD2 has a priority level of 3.

As further shown in FIG. 9A, PUD may prompt the user of PUD to choose which services are to have service requests forwarded to BUD1, and to choose which services are to have service requests forwarded to BUD2. As shown, the user may indicate that a service request associated with the voice service is to be forwarded to BUD1, may indicate that a service request associated with the text messaging service is not to be forwarded to BUD1, may indicate that a service request associated with the Facepage service is not to be forwarded BUD1, and may indicate that a service request associated with the Facepage service is to be forwarded to BUD2. As further shown, PUD may provide information, to failover device 230, indicating that the failover condition has been satisfied and that services, associated with service requests to be forwarded to BUD1 and BUD2, have been selected.

As shown in FIG. 9B, failover device 230 may attempt to contact BUD1 to initiate the provision of the service (e.g., voice service) to BUD1, and may successfully contact BUD1. As further shown, failover device 230 may attempt to contact BUD2 to initiate the provision of the service (e.g., Facepage service) to BUD2, and may successfully contact BUD2. As further shown, failover device 230 may provide profile information associated with the Facepage service (e.g., a username, a password, etc.) to BUD2. BUD2 may initiate a Facepage application, associated with the Facepage service, using the profile information received from failover device 230.

As shown in FIG. 9C, a third party mobile device may request to initiate a voice call with PUD. As shown, the request may be received by failover device 230, and failover device 230 may forward the request to BUD1 (e.g., rather than forwarding the request to PUD). The voice call may be established between the third party device and BUD1. As further shown in FIG. 9C, a Facepage server may request to connect to PUD. As shown, the request may be received by failover device 230, and failover device 230 may forward the request to BUD2 (e.g., rather than forwarding the request to PUD). The connection may be established between the Facepage server and BUD2.

As indicated above, FIGS. 9A-9C are provided merely as an example. Other examples are possible and may differ from what was described with regard to FIGS. 9A-9C.

Implementations described herein may allow a service to be provided to a backup user device, specified by a user, when a primary user device has detected a failover condition.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
    one or more processors to:
        receive information that identifies a failover configuration associated with a user device,
            the failover configuration indicating:
                the user device associated with a first failover condition,
                a first backup user device associated with a first service and a second failover condition, and
                a second backup user device associated with a second service and a third failover condition,
                    the first service being different than the second service, and
                    the first backup user device being different than the second backup user device;
        receive information, from the user device, indicating that the first failover condition, identified in the failover configuration, has been satisfied;
        identify the first backup user device and the second backup user device based on the failover configuration and receiving the information indicating that the first failover condition has been satisfied;
        contact the first backup user device based on identifying the first backup user device;
        contact the second backup user device based on identifying the second backup user device;
        determine that a first service request, associated with the first service and intended for the user device, is to be forwarded to the first backup user device based on contacting the first backup user device and the second failover condition,
            the first service including at least one of a messaging service, an application service, or a video conferencing service,
        forward the first service request to the first backup user device to permit the first backup user device to obtain the first service rather than the user device;
        determine that a second service request, associated with the second service and intended for the user device, is to be forwarded to the second backup user device based on contacting the second backup user device and based on the third failover condition,
            the second service including at least one different one of the messaging service, the application service, or the video conferencing service than the first service; and
        forward the second service request to the second backup user device to permit the second backup user device to obtain the second service rather than the user device.

2. The device of claim 1, where the one or more processors are further to:
    receive information, associated with a user input, identifying the first backup user device, the first failover condition, or the first service; and
    where the one or more processors, when receiving the information that identifies the failover configuration associated with the user device, are to:
        receive the information that identifies the failover configuration based on receiving the information associated with the user input.

3. The device of claim 1, where the first failover condition identifies at least one of:
    a threshold power level associated with the user device;
    a threshold signal strength associated with the user device;
    an indication that the user device is outside of a coverage area of a service provider network; or
    an indication that the user device is connected to a roaming network.

4. The device of claim 1, where the one or more processors are further to:
    identify a first failover priority associated with the first backup user device;
    identify a second failover priority associated with a third backup user device; and compare the first failover priority to the second failover priority;
where the one or more processors, when identifying the first backup user device, are to:
identify the first backup user device based on comparing the first failover priority to the second failover priority.

5. The device of claim 1, where the one or more processors, when forwarding the first service request to the first backup user device, are to:
provide user information, associated with the first service, to the first backup user device.

6. The device of claim 1, where the first service includes the video conferencing service, and
where the one or more processors, when forwarding the first service request to the first backup user device, are to:
forward an existing first service request, associated with an in progress video call session of the video conferencing service between the user device and a third party device, from the user device to the first backup user device without initiating a new video call session between the first backup user device and the third party device.

7. The device of claim 1, where the one or more processors, are further to:
receive information, from the first backup user device, indicating that the second failover condition, associated with the first backup user device, has been satisfied;
identify a third backup user device based on detecting that the second failover condition has been satisfied;
determine that a third service request is to be forwarded to the third backup user device; and
forward the third service request, associated with the first service, to the third backup user device.

8. A non-transitory computer-readable medium storing instructions, the instructions comprising:
one or more instructions that, when executed by one or more processors, cause the one or more processors to:
receive information that identifies a failover configuration associated with a user device,
the failover configuration indicating a first service request intended for the user device is to be provided to a first backup user device when the user device is unreachable and a second service request intended for the user device to be provided to a second backup user device when the user device is unreachable,
the failover configuration indicating a first failover condition for the first backup user device and a second failover condition for the second backup user device,
the first service request including at least one of a messaging service request, an application service request, or a video conferencing service request,
the second service request including at least one different one of the messaging service request, the application service request, of the video conferencing service request, and
the first backup user device being different than the second backup user device;
receive, from a device associated with a service provider network, information indicating that the user device is unreachable;
identify the first backup user device and the second backup user device based on the failover configuration and receiving the information indicating that the user device is unreachable;
contact the first backup user device based on identifying the first backup user device and determine whether the first failover condition is satisfied;
contact the second backup user device based on identifying the second backup user device and determine whether the second failover condition is satisfied;
receive the first service request associated with a first service and intended for the user device,
provide, based on the failover configuration, the first service request to the first backup user device to permit the first backup user device to receive a first service rather than the user device;
receive the second service request, associated with a second service and intended for the user device; and
provide, based on the failover configuration, the second service request to the second backup user device to permit the second backup user device to obtain the second service rather than the user device.

9. The non-transitory computer-readable medium of claim 8, where the one or more instructions, when executed by the one or more processors, further cause the one or more processors to:
receive information, associated with a user input, identifying the first backup user device, a failover condition associated with the user device, or the first service; and
where the one or more instructions, that cause the one or more processors to receive the information that identifies the failover configuration, cause the one or more processors to:
receive the information that identifies the failover configuration based on receiving the information associated with the user input.

10. The non-transitory computer-readable medium of claim 8, where the one or more instructions, when executed by the one or more processors, further cause the one or more processors to:
identify a first failover priority associated with the first backup user device;
identify a second failover priority associated with a third backup user device; and
compare the first failover priority to the second failover priority;
where the one or more instructions, that cause the one or more processors to identify the first backup user device, cause the one or more processors to:
identify the first backup user device based on comparing the first failover priority to the second failover priority.

11. The non-transitory computer-readable medium of claim 8, where the one or more instructions, that cause the one or more processors to provide the first service request to the first backup user device, cause the one or more processors to:
provide user information, associated with the first service, to the first backup user device.

12. The non-transitory computer-readable medium of claim 8, where the one or more instructions, that cause the one or more processors to provide the first service request to the first backup user device, cause the one or more processors to:
provide an existing first service request, associated with an in progress session of the first service, from the user device to the first backup user device without terminating the in progress session.

13. The non-transitory computer-readable medium of claim 8, where the one or more instructions, when executed by the one or more processors, further cause the one or more processors to:
receive information, from the first backup user device, indicating that the first failover condition, associated with the first backup user device, has been satisfied;
identify a third backup user device based on detecting that the first failover condition has been satisfied;
determine that a third service request is to be forwarded to the third backup user device; and
provide the third service request, associated with the first service, to the third backup user device.

14. The non-transitory computer-readable medium of claim 13, where the first failover condition identifies an indication that the first backup user device is connected to a roaming network.

15. A method, comprising:
receiving, by a device, information that identifies a failover configuration associated with a user device and a backup user device
the failover configuration indicating:
the user device associated with a first failover condition,
a first backup user device associated with a first service and a second failover condition, and
a second backup user device associated with a second service and a third failover condition,
the first service being different than the second service, and
the first backup user device being different than the second backup user device;
obtaining, by the device, information, from the user device, indicating that the first failover condition, associated with the user device identified in the failover configuration, has been satisfied;
identifying, by the device, the first backup user device and the second backup user device based on receiving the information indicating that the first failover condition has been satisfied;
interacting, by the device, with the first backup user device based on identifying the first backup user device;
interacting, by the device, with the second backup user device based on identifying the second backup user device;
determining, by the device, that a first service request, associated with flail the first service and intended for the user device, is to be forwarded to the first backup user device based on interacting with the first backup user device and the second failover condition,
the first service including at least one of a messaging service, an application service, or a video conferencing service,
the first service being identified by the failover configuration; and
forwarding, by the device, the first service request to the first backup user device to permit the first backup user device to obtain the first service rather than the user device;
determining, by the device, that a second service request, associated with the second service and intended for the user device, is to be forwarded to the second backup user device based on interacting with the second backup user device and the third failover condition,
the second service including at least one different one of the messaging service, the application service, or the video conferencing service than the first service; and
forwarding, by the device, the second service request to the second backup user device to permit the second backup user device to obtain the second service rather than the user device.

16. The method of claim 15, further comprising:
receiving information, associated with a user input, identifying the first backup user device, the first failover condition, or the first service; and
where receiving the information that identifies the failover configuration associated with the user device comprises:
receiving the information that identifies the failover configuration based on receiving the information associated with the user input.

17. The method of claim 15, further comprising:
identifying a first failover priority associated with the first backup user device;
identifying a second failover priority associated with a third backup user device; and
comparing the first failover priority to the second failover priority;
where identifying the first backup user device comprises:
identifying the first backup user device based on comparing the first failover priority to the second failover priority.

18. The method of claim 15, further comprising:
receiving information, from the first backup user device, indicating that the second failover condition, associated with the first backup user device, has been satisfied;
identifying a third backup user device based on detecting that the second failover condition has been satisfied;
determining that a third service request is to be forwarded to the third backup user device; and
forwarding the third service request, associated with the first service, to the third backup user device.

19. The device of claim 1, where the second failover condition identified by the failover configuration associated with the user device, identifies a threshold power level associated with the first backup user device.

20. The device of claim 1, where the second failover condition identified by the failover configuration associated with the user device, identifies a threshold signal strength associated with the first backup user device.

* * * * *